United States Patent [19]

Vasiliadis et al.

[11] Patent Number: 5,778,111
[45] Date of Patent: Jul. 7, 1998

[54] OPTICAL FIBRE FLAT SCREEN

[75] Inventors: Socrates Vasiliadis, Hunters Hill; Alan Weingarten, St Ives; Riaz Mehta, Cremorne, all of Australia

[73] Assignee: Ramasoft³ Pty. Limited, Hunters Hill, Australia

[21] Appl. No.: 588,124

[22] Filed: Jan. 18, 1996

[51] Int. Cl.⁶ ..................................................... G02F 1/035
[52] U.S. Cl. ........................... 385/2; 385/116; 385/901
[58] Field of Search ........................ 385/2, 116, 901

[56] References Cited

U.S. PATENT DOCUMENTS

| | | | |
|---|---|---|---|
| 3,491,245 | 1/1970 | Hardesty | 385/901 |
| 3,829,675 | 8/1974 | Mariani | 385/901 |
| 4,761,047 | 8/1988 | Mori | 385/901 |
| 5,101,466 | 3/1992 | Reidinger | 385/147 |
| 5,226,105 | 7/1993 | Myers | 385/901 |
| 5,312,570 | 5/1994 | Halter | 385/901 |
| 5,329,386 | 7/1994 | Birecki et al. | 385/901 |
| 5,339,179 | 8/1994 | Rudisill et al. | 385/901 |
| 5,584,556 | 12/1996 | Yokoyama et al. | 385/901 |

FOREIGN PATENT DOCUMENTS

| | | |
|---|---|---|
| 4011556 | 8/1990 | Germany. |
| 8503397 | 8/1985 | WIPO. |
| 9013158 | 11/1990 | WIPO. |

*Primary Examiner*—Rodney B. Bovernick
*Assistant Examiner*—Robert E. Wise
*Attorney, Agent, or Firm*—Edwin D. Schindler

[57] ABSTRACT

A flat screen panel (1) comprising a base plate (9) and a plurality of optical fibers (2) laid in parallel on the base plate (9). Each of the optical fibers (2) has a modified portion (11) on its side (13) facing outwardly from the base plate (9), the modified portion (11) being able to transmit light therethrough. A plurality of light sources in arrays (4) are connected to the optical fibers (2) at one end thereof, each of the optical fiber (2) having at least one light source element (25) connected thereto. A drive circuit means is connected to the plurality of light sources to drive the light sources to transmit light through the optical fibers (2) and thence through the modified portions (11) of the optical fibers (2).

10 Claims, 6 Drawing Sheets

5,778,111

1

OPTICAL FIBRE FLAT SCREEN

BACKGROUND ART

Current colour flat screen panels use Thin Film Transistor (TFT) technology to achieve best results. This technology produces good results but at high costs due to production failure rates. A 640×480 VGA screen has 307,200 pixels, with each pixel being represented by a cluster of three light sources emitting, red, green and blue light respectively. This means that the total number of transistors per screen is 921,600. If any of these transistors is faulty, then the screen is considered faulty.

OBJECT OF THE INVENTION

It is an object of the present invention to provide a flat screen panel which substantially reduces the number of light sources.

SUMMARY OF THE INVENTION

According to one aspect of the present invention there is disclosed a flat screen panel apparatus comprising a base, a plurality of optical fibres positioned in parallel on said base, each said optical fibre having a modified portion on its side facing outwardly from said base, said modified portion being able to transmit light therethrough, a plurality of light sources connected to said optical fibres at one end thereof, each said optical fibre having at least one light source connected thereto, and a drive circuit means connected to said plurality of light sources to drive said light sources to transmit light through said optical fibres and thence through said modified portions of said optical fibres.

BRIEF DESCRIPTION OF THE DRAWINGS

Some embodiments of the present invention will described with reference to the drawings in which.

2

Figure 9:
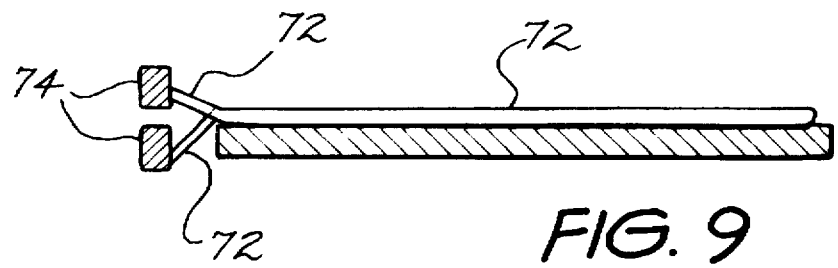
Figure 10:
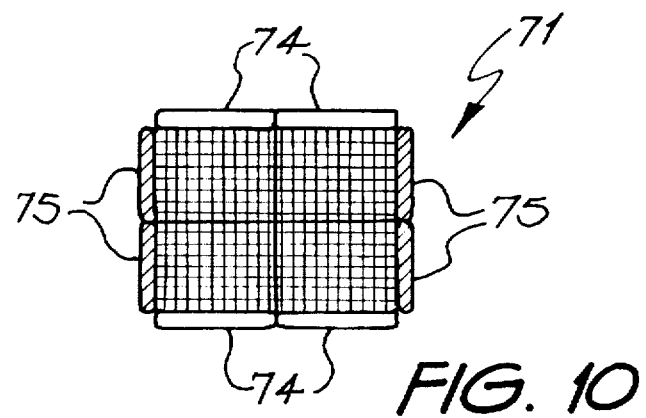
Figure 11:
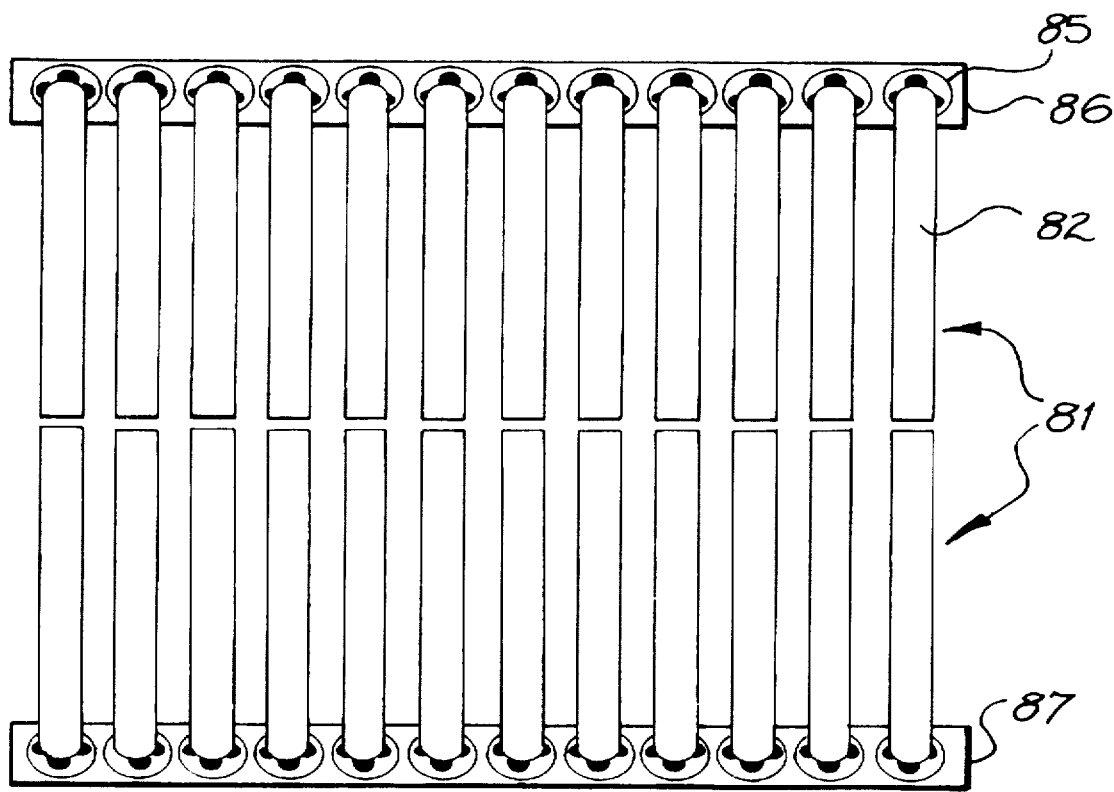

FIG. 9 is a schematic side view of a sixth embodiment of a flat screen with a staggered light emitting array of light sources arrangement;

FIG. 10 is a schematic diagram of a multipanel screen arrangement using the staggered light emitting array arrangement of FIG. 9; and FIG. 11 is a schematic diagram of a further embodiment illustrating panel halving.

BEST MODE OF CARRYING OUT THE INVENTION

An optical fibre flat screen panel 1 of the preferred embodiments includes a number of optical fibres 2 and a number of light sources 3 in an array 4. The light sources 3 are preferably Thin Film Transistors (TFTs) and are preferably colour TFTs i.e. red, green and blue. The optical fibres 2 are located on a base plate 5 (FIG. 9) and are used to emit coloured light from the screen 1.

Figure 1:
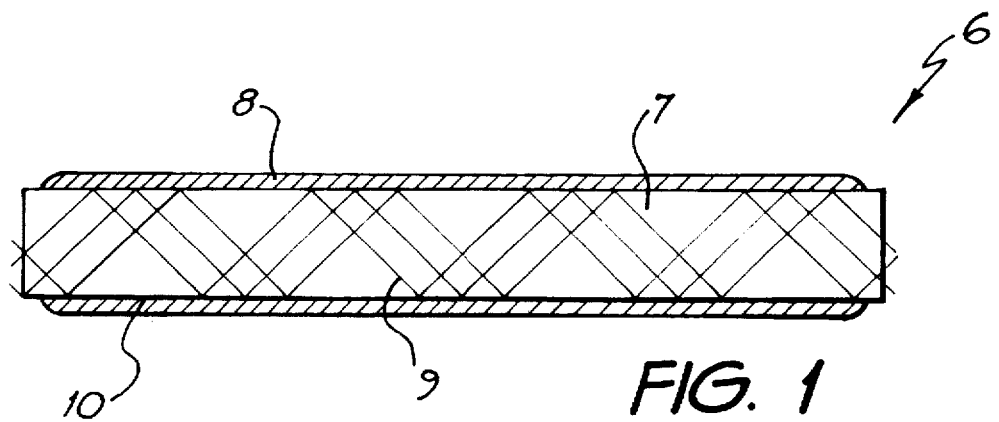
FIG. 1 is a partial schematic diagram of light travelling through an optical fibre.

Optical fibres which are used in telecommunications or other such areas, are constructed in a way to maximise the transmission of light with minimal loss. A typical optical fibre 6 as illustrated in FIG. 1, consists of a special glass core 7 covered with a protective silicon sheath 8 which adds flexibility and strength. Light rays 9 are able to travel along the length of the core 7 and are reflected by the outer layer 10 of the side of the core 7, rather than being transmitted through the outer layer 10. The light rays 9 are thus transmitted through the optical fibre 6 as illustrated in FIG. 1.

Figure 2:
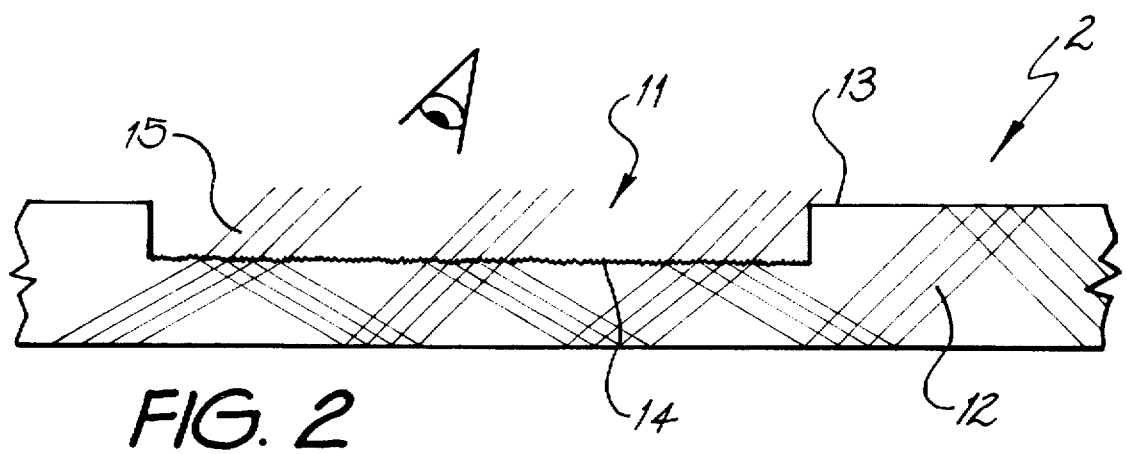
FIG. 2 is a partial schematic diagram of a modified optical fibre showing how light is emitted from the side of the fibre.

The optical fibre 2 of a first embodiment, as illustrated in FIG. 2, has an etched portion 11 (which has a roughness which has been exaggerated), which enables light rays 12 to be transmitted through the etched portion 11 in a band of light to become visible through the side 13. In the embodiments of the present invention the protective sheath has been removed. It is noted that some of the light is still reflected by the outer surface 14 of the etched portion 11 and continues to travel along the optical fibre 2. It is also noted that the angle of transmission of the transmitted light rays 15 is different from the angle of incidence of the light rays 12 due to the difference of the medium, i.e. air compared to glass. The loss of intensity of the light rays 12 within the optical fibre 2 varies depending on the angle of incidence, the etched wall, etc. The optical fibre 2 is preferably etched, however the optical fibre 2 can be modified in other ways to obtain the same effect such as by shaving the side wall 13.

Figure 3:
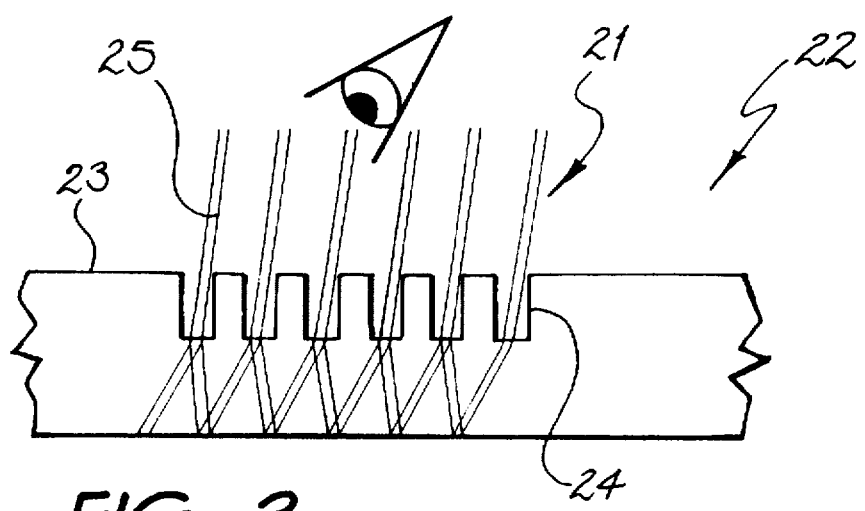
FIG. 3 is a partial schematic diagram of a variation of a modified optical fibre showing the light emitted from the side of the fibre.

Another embodiment of an optical fibre 22 is illustrated in FIG. 3. In this embodiment a number of etched or modified portions 21 are provided in a wall 23 of the optical fibre 22 in a pattern of slots 24. This means that the light rays 26 are emitted from the side wall 23 in discrete blocks where the optical fibre 22 has been modified.

Light is a collection of electromagnetic frequencies, and a certain range of electromagnetic frequencies which are visible to the naked eye are often referred to as the visible spectrum. White light is a collection of coloured light, all mixed together. When white light is passed through a prism (not illustrated), the different frequencies of the different colours of light are diffracted and transmitted at different angles, which enables a single white light beam to be broken into a light spectrum containing all the visible colours.

The three main colours which are used in flat screen technology are red, green and blue, and when they have equal intensity and are mixed equally, white light results. This physical property of light is used in colour cathode ray tubes (CRTs) and other devices. Different intensities of these three colours, produce a range of different colours. The number of colours generated by varying the intensity of the primary colours, is proportional to the discrete number of increments in intensity.

It is noted that if red, green and blue light sources are positioned at one end of an optical fibre 2,22 that light of different colours can be emitted from the etched portions 11,21 by varying the intensity of the light sources. An observer would see a solid colour, rather than three light sources.

The embodiment as illustrated in FIG. 3 allows enhancement and control as light is transmitted by only the etched portions 21 which have been chosen on the optical fibre 22.

Figure 4:
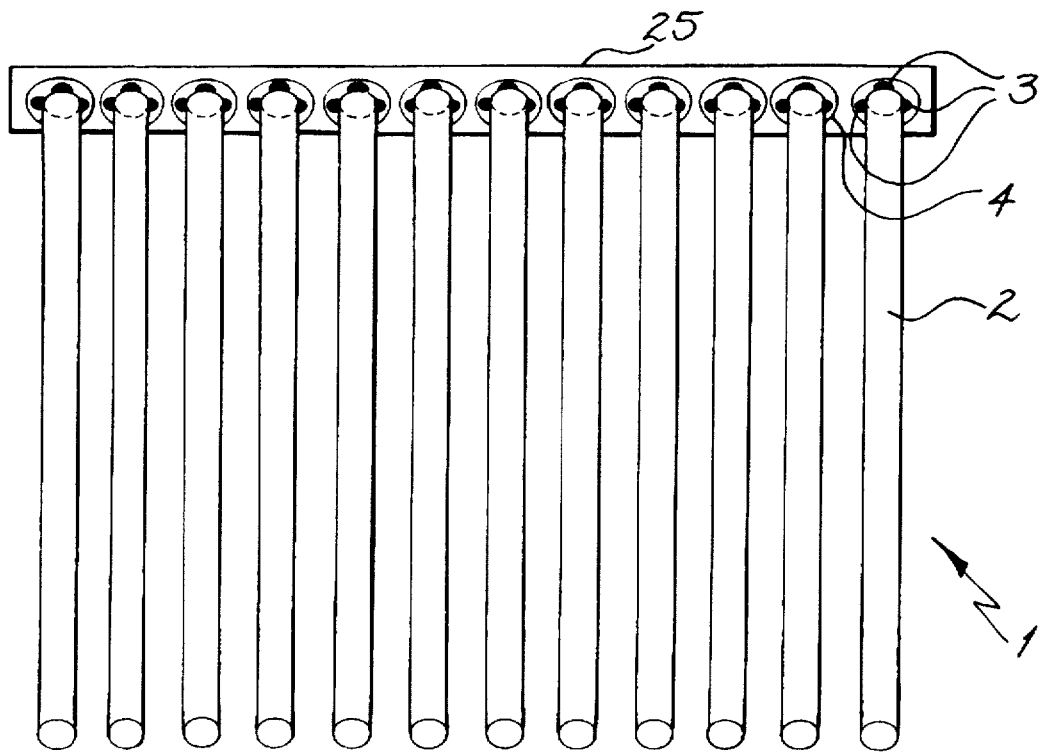
FIG. 4 is a schematic diagram of a first embodiment of a flat screen with a light emitting array of light sources being connected to an optical fibre panel, where a single fibre is used per light source.

The preferred embodiments of the present invention use light emitting arrays 4, containing red, green and blue elements as the array elements 25 of the light sources of the three colours red, green and blue. In a first embodiment as illustrated in FIG. 4, for a VGA display, the light emitting array 4 requires 640×3 light sources (Red, Green and Blue) connected to 640 optical fibres 2. This includes 640 trios of array elements 25. The total number of light emitting transistors is 640×3=1,920 (which uses the three light sources per optical fibre 2) which is substantially less than 921,600 for a TFT screen as described above. The light array 4 which drives the optical fibres 2 is capable of driving higher intensities of light compared to current TFT arrays, due to a smaller loss component. As the size of the light array elements 25 is a consideration, the arrays 4 can be staggered as will be described later.

Figure 4A:
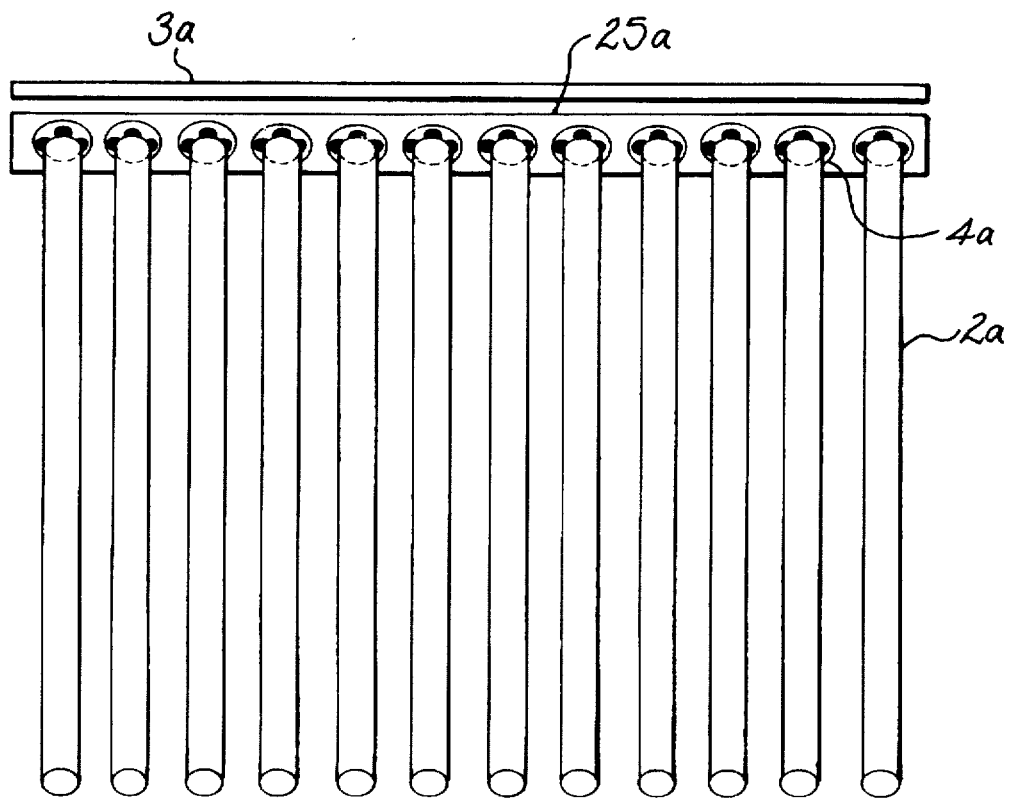
FIG. 4a is a schematic diagram of a variation of the first embodiment of a flat screen with a light emitting array of light sources being connected to an optical fibre panel, where a single fibre is used per light source.

In this embodiment each trio of light sources 3 of the array elements 25 is connected to only one optical fibre 2. The optical fibres 2 are mounted on the base 5 to form a flat screen panel 1. The appropriate driving electronics circuitry (not illustrated) is used to change the intensity of each trio of the array elements 25, to produce bands of colour light on the optical fibre panel 1. In the embodiment as illustrated in FIG. 4(a), a single light source 3a, such as a fluorescent tube, illuminates a TFT array 4a having a trio of TFTs.

Figure 5:
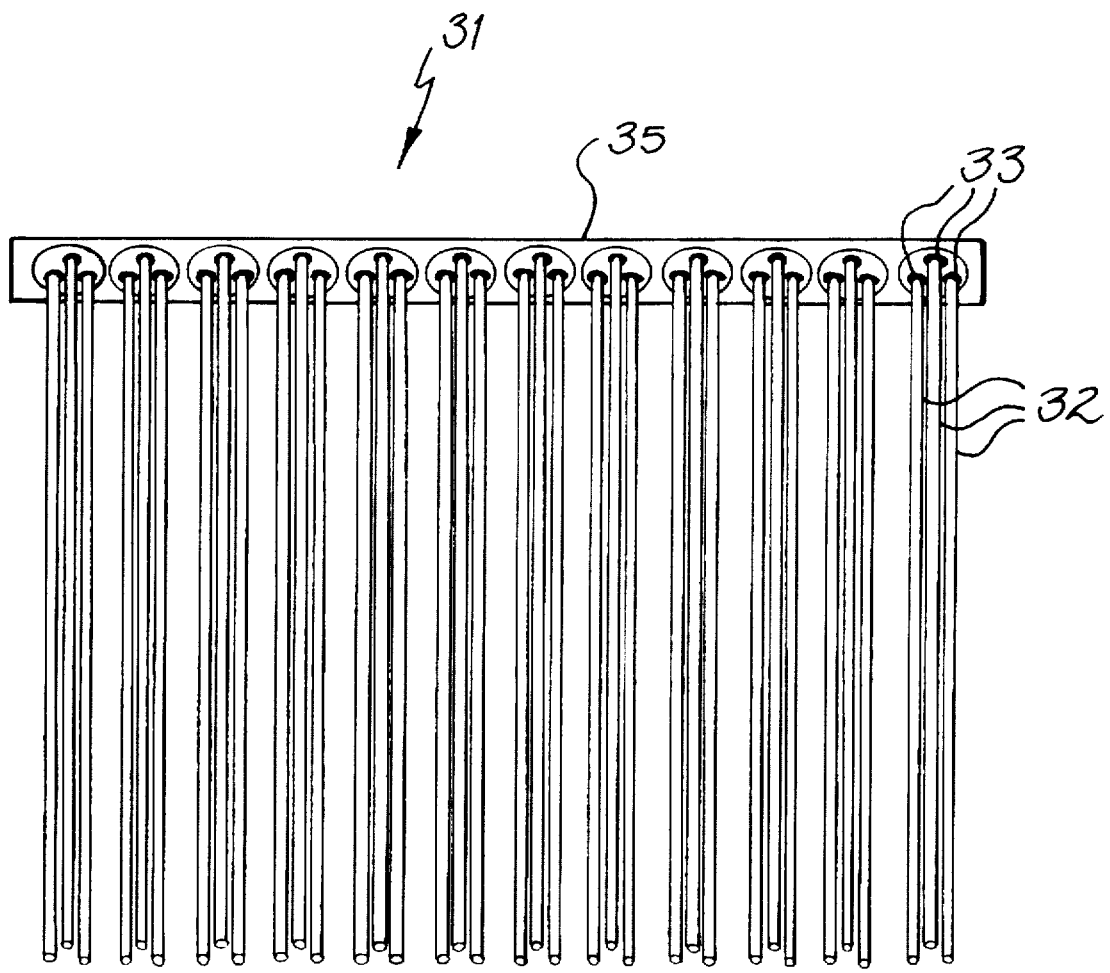
FIG. 5 is a schematic diagram of a second embodiment of a flat screen with a light emitting array of light sources being connected to an optical fibre panel, where three fibres are used per light source.

In a second embodiment as illustrated in FIG. 5, three optical fibres 32 are shown connected to each trio of array elements 35, i.e. each colour light source 33 in the array element 35 is connected to a corresponding optical fibre 32. This flat screen panel 31 achieves bands of controlled colour light by applying a concept similar to the Trinitron (Registered Trade Mark) method. Trinitron (Registered Trade Mark) uses vertical stripes of light rather than distinct dots, as each optical fibre 32 is driven by a single light source 33, either a red, green or blue in sequence. In this arrangement, the number of light sources 33 is 640×3=1920 and the number of optical fibres is 640×3=1920 which is greater than the previously described embodiment. The advantages of this embodiment is that the coupling of the optical fibres 32 is easier, however, the visual quality of the flat screen panel 31, i.e. dot pitch, is not as good as the previous embodiment.

Figure 6:
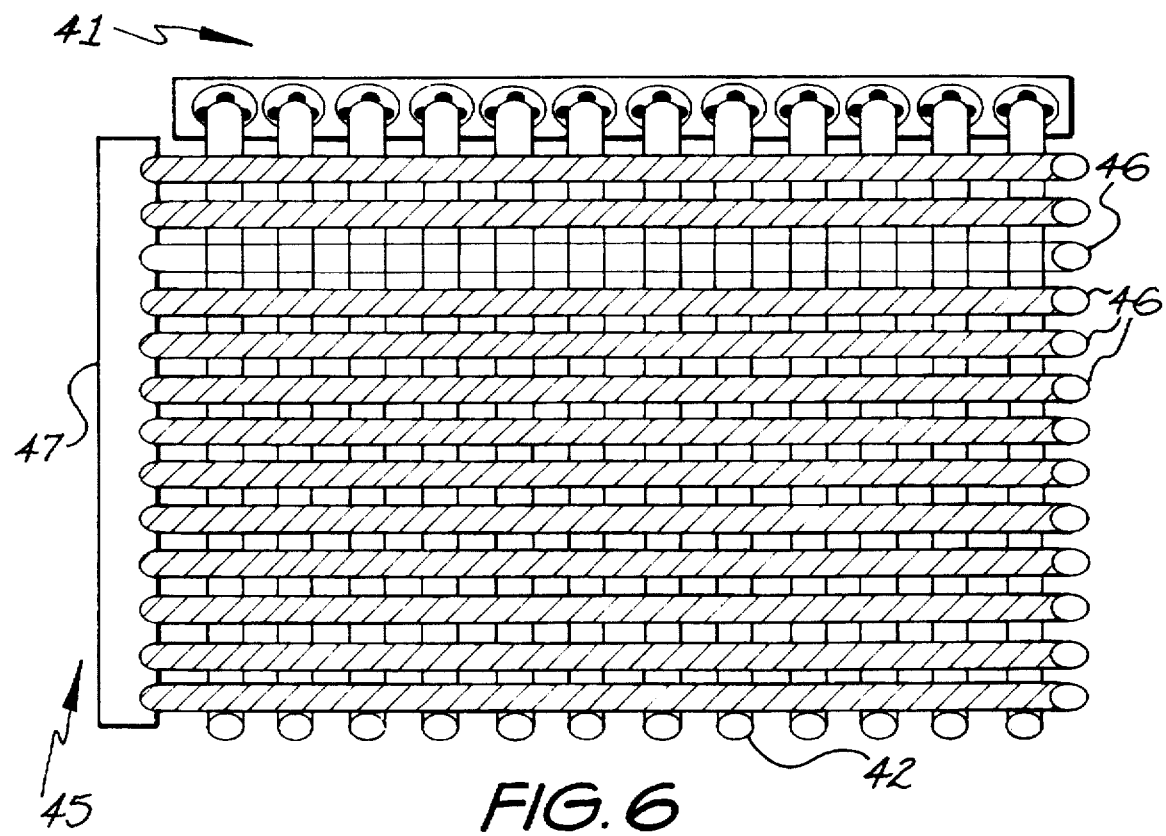
FIG. 6 is a schematic diagram of a third embodiment of a flat screen with a light emitting array of light sources being connected to an optical fibre panel, with a single fibre connected per light source, and an LCD shutter mechanism being used to cover said panel.

The embodiments which have been described can not display selected shapes as there is no control along the horizontal axis of the panels 1,31. In order to control the optical panel as a grid of pixels, control of the light emitted along the vertical axis is required. In a third embodiment as illustrated in FIG. 6, a shutter mechanism 45 is applied to a panel 40 which is as described with reference to the first embodiment.

The shutter mechanism 45 allows a selected portion of the optical fibres 42 to be visible, one at a time, continuously scanning the screen at a preferable rate of at least 60 Hz. It is noted that 20 frames per second (or 20 Hz) are enough to "fool" the eye into perceiving a steady image. Refresh rates higher than 20 Hz. are preferable for "picture steadiness". Industry standards in Cathode Ray Tube monitors recommend at least 60 Hz. for comfortable viewing display.

The shutter mechanism 45 includes a number of Liquid Crystal Displays (LCD) shutters 46 connected to a LCD shutter array 47. The shutters 46 provide horizontal divisions on each optical fibre 42, and show only a portion of the optical fibre 42 equal to one pixel. The horizontal divisional constitute the vertical resolution of the flat screen panels 41 as opposed to the horizontal resolution of the panel 41 which equals the number of optical fibres 42 on the panel 41.

For the flat screen panel 41 to have VGA implementation, the 480 shutters are refreshed at 60 Hz. Each screen refresh cycle takes 1/60 second and since there are 480 shutters per flat screen panel 41, each shutter 46 is turned on/off in $[(1/60)/480]=34.7$ microseconds. This refresh rate is for use with a non-interlaced refresh cycle, whereby an interlaced refresh cycle, which alternatively switches the odd and even rows respectively, requires a response time of $[(1/60)/240]=69.4$ microseconds. Such an interlaced refresh cycle puts less strain on the electronics with a small trade-off on picture quality.

With the use of TFT screens, the requirements for an enlargement of the screen are dramatic in that the additional number of pixels required is quite large. The problems of failure rate on the manufacturing process often prohibit such changes. However, to enlarge a screen according to the present invention, more optical fibres can be placed in the vertical axis while the LCD shutters can be lengthened to add to horizontal length, as well as lengthening the optical fibres and adding further LCD shutters to add to the vertical height.

For example to increase the screen to a 800×480 pixels, refresh rates and shutter electronics do not need to be changed. If the screen is to be enlarged along both axes, in order to maintain the set refresh rate of the screen, the LCD shutters 46 will have a faster switching time.

Figure 7:
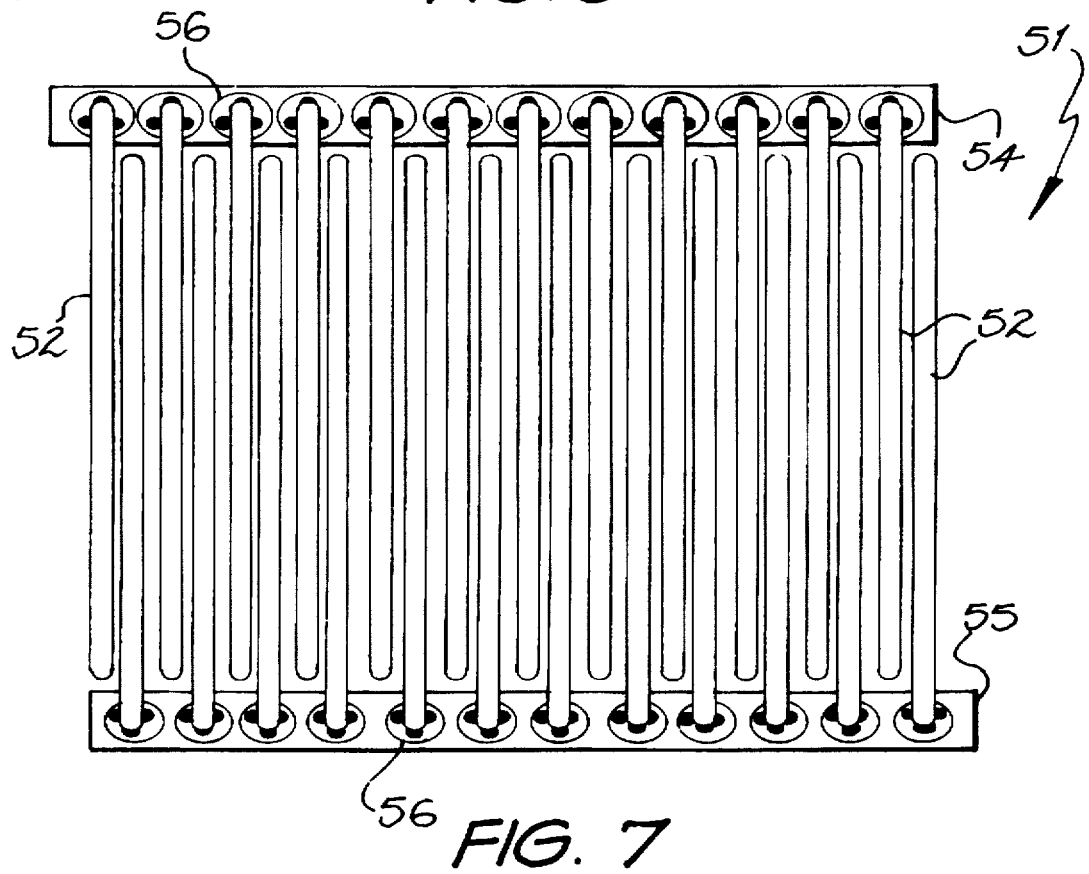
FIG. 7 is a schematic diagram of a fourth embodiment of a flat screen with top and bottom light emitting arrays of light sources being connected to corresponding pairs of single optical fibres.

In a further embodiment as illustrated in FIG. 7, a panel 51 has a top light source array 54 and a bottom light source array 55. Each of the arrays 54 and 55 have half the total number of light source elements 56. Each alternate optical fibre 52 is driven either from the top array 54 or bottom array 55. Uniformity in light intensity is achieved and the elements 56 can be substantially bigger when compared to a single array. It is noted that the LCD shutter is not shown.

Figure 8:
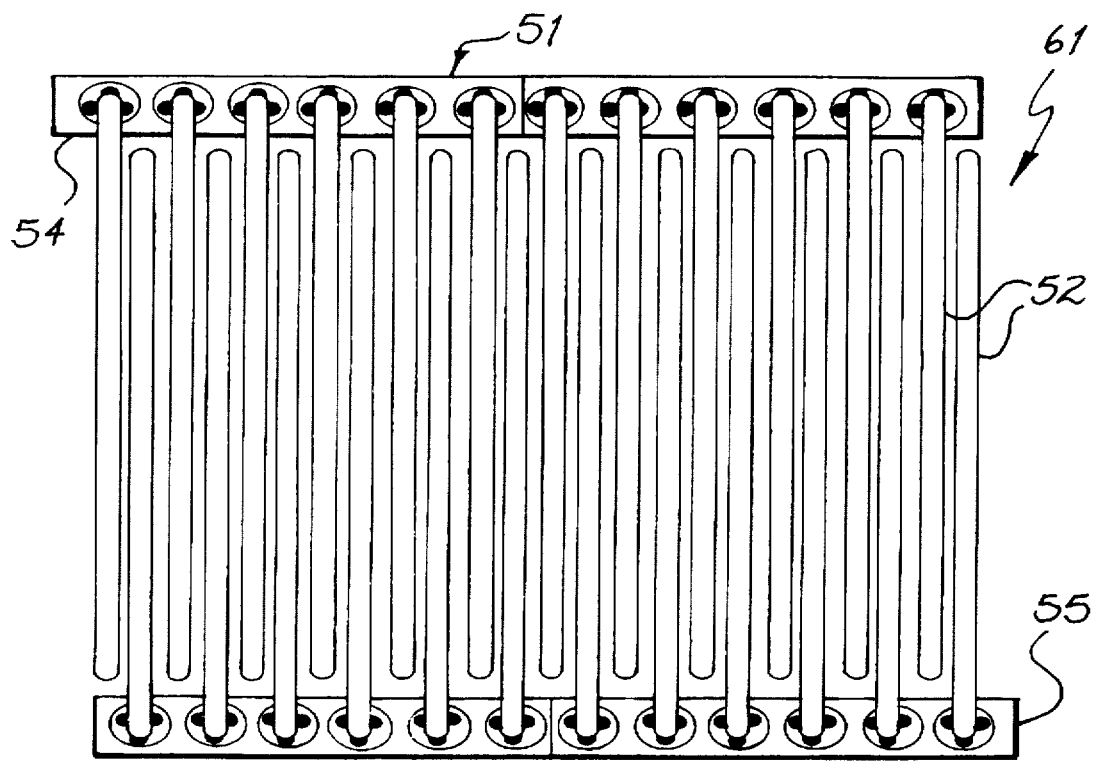
FIG. 8 is a schematic diagram of a fifth embodiment illustrating two panels as illustrated in FIG. 7, being arranged in a side-by-side arrangement.

Using a panel 51 of the above described embodiment, a screen 61 can be built by combining two panels 51 together as illustrated in FIG. 8. However the screen 61 is restricted in that two panels 51 cannot be combined in the vertical direction. It is noted that the LCD shutter is not shown.

In order to avoid the restrictions of a top-bottom light source array as illustrated in FIG. 7, a staggered array configuration as illustrated in FIG. 9 is provided. This configuration allows the arrays to be positioned to allow a multipanel display screen 71 as illustrated in FIG. 10. In this arrangement the staggered arrays 74 are positioned to the front and rear of the multipanel (4) display screen 71 with the LCD shutters array 75 being positioned at the left and right sides.

In a further embodiment as illustrated in FIG. 11, two half panels 81 are combined with each optical fibre 82 having a single light source element 85 which is in either a top array 86 or bottom array 87. The LCD shutters are not illustrated but are in half (top and bottom) and each half is refreshed independently simultaneously. This panel halving has the effect of producing non-interlaced quality displays using refresh rates and shutter response times equivalent to that of an interlaced display. This panel halving arrangement is extendable to use with multiple panel technology for large displays.

In use to achieve a steady image for given screen resolution, the following refresh rates of the LCD shutter array is given in the following tables.

TABLE 1

Response time in micro-seconds for Non-Interlaced display at set Refresh Rates.

| Resolution | SHUTTER # | µsec RESPONSE @ 50 Hz | µsec RESPONSE @ 60 Hz | µsec RESPONSE @ 70 Hz |
|---|---|---|---|---|
| VGA 640X480 | 480 | 41.7 | 34.7 | 29.8 |
| SVGA 800X600 | 600 | 33.3 | 27.8 | 23.8 |
| SVGA 1024X768 | 768 | 26.0 | 21.7 | 18.6 |
| SVGA 1280X1024 | 1024 | 19.5 | 16.3 | 14.0 |

For interlaced designs, the effective resolution for the screen is halved. Due to the reduced effective resolution the required response time of the LCD shutter array is also halved. These changes are reflected in the table below.

TABLE 2

Response time in micro-seconds for Interlaced display at set Refresh Rates.

| Resolution | SHUTTER # | µsec RESPONSE @ 50 Hz | µsec RESPONSE @ 60 Hz | µsec RESPONSE @ 70 Hz |
|---|---|---|---|---|
| VGA 640X480 | 240 | 83.3 | 69.4 | 59.5 |
| SVGA 800X600 | 300 | 66.7 | 55.6 | 47.6 |
| SVGA 1024X768 | 384 | 52.1 | 43.4 | 37.2 |
| SVGA 1280X1024 | 512 | 39.1 | 32.6 | 27.9 |

The controls which are used on the screens of the embodiments as described include: brightness, contrast, colour saturation.

Brightness control is the baseline of EQUAL LIGHT INTENSITY on all the light source elements of the screen. This is achieved by setting the base drive voltage of the light source array to a value common across the whole array.

Contrast is the UNIFORM INCREASE or DECREASE of INTENSITY across the light source array elements that have an "ON" status.

Colour is controlled via the mix of RED, GREEN and BLUE INTENSITIES of a single light source element.

INDUSTRIAL APPLICABILITY

Due to the design of the screen, various applications can benefit from the flexibility offered. Since there is minimal EMF and other forms of transmitted radiation as compared to CRTs, Military as well as Medical applications can greatly benefit. Applications that also demand large screen designs, such as High Definition TV, Flat Screen TV, Large Monitoring Panels (Power Stations, TV Studios, Large Presentations) can utilise the benefits of single or multiple panel screen designs.

In larger screen designs the yield rate is a major determining factor of price/performance. Fibre Optic panels suffer none of the technological limitations of today's offerings. This is largely due to the fact that the screen design and production scale is elevated from the micro level to a more practical macro level.

The following table summarises some of the key features of various screen designs:

| Features | CRT | Passive LCD Panel | Active Panel | Optical Fibre Panel |
|---|---|---|---|---|
| Low EMF | | Yes | Yes | Yes |
| High Resolution | Yes | | | Yes[1] |
| Large Screens | Yes | | | Yes |
| High Contrast | Yes | | Yes | Yes |
| Low Power | | Yes | | Yes |
| Low Cost | Yes[2] | Yes | | Yes |
| High Yield | Yes | Yes | | Yes |
| Long Life | | Yes | Yes | |
| Repairable[3] | Yes | | | Yes |

[1] Utilising technologies outlined in this document
[2] Low cost for small to medium size monitors. Large screens are expensive to manufacture.
[3] Via part replacements.

The foregoing describes only some embodiments of the present invention and modifications obvious to those skilled in the art can be made thereto without departing from the scope of the present invention.

We claim:

1. A flat screen panel apparatus comprising a base, a plurality of optical fibers positioned in parallel on said base, each said optical fiber having means for conducting light from said optical fiber on its side facing outwardly from said base, said means for conducting light being able to transmit light therethrough, a plurality of light sources connected to said optical fibres at one end thereof, each said optical fibre having at least one light source connected thereto, and drive circuit means connected to said plurality of light sources to drive said light sources to transmit light through said optical fibers and thence through said means for conducting light of said optical fibers.

2. The flat screen panel apparatus as claimed claim 1, further comprising shutter means for selectively blocking parts of means for conducting light to prevent light transmission, said shutter means having control means to control operation of said shutter means.

3. The flat screen panel apparatus as claimed in claim 2, wherein said shutter means comprises a plurality of shutters which provide perpendicular divisions on each said optical fiber.

4. The flat screen panel apparatus as claimed in claim 3, wherein said perpendicular divisions are equivalent to one pixel.

5. The flat screen panel apparatus as claimed in claim 4, wherein said plurality of shutters are liquid crystal display (LCD) shutters connected to a LCD shutter array.

6. The flat screen panel apparatus as claimed in claim 1, wherein said plurality of light sources are positioned along one side edge of said panel in a single array.

7. The flat screen panel apparatus as claimed in claim 1, wherein said plurality of light sources are positioned along two opposite side edges of said panel in a pair of opposed arrays.

8. The flat screen panel apparatus as claimed in claim 1, wherein said plurality light sources are positioned along one side edge of said panel in at least one pair of staggered arrays.

9. The flat screen panel apparatus as claimed in claim 1, wherein said plurality of light sources are positioned along two opposite side edges of said panel with said light sources being connected to a corresponding said optical fiber which has a length of about half the length of said panel, wherein two said optical fibers are positioned end to end in the parallel arrangement.

10. The flat screen panel apparatus as claimed in claim 1, wherein a combination of a single light means and a thin film transistor (TFT) array constitutes a separate light source, with a plurality of said combinations of said separate light sources constituting said plurality of light sources.

* * * * *